Nov. 26, 1963   W. HORTON ETAL   3,112,022
METHODS AND APPARATUS FOR FORMING A STREAM OF ARTICLES
Filed March 22, 1961   4 Sheets-Sheet 1
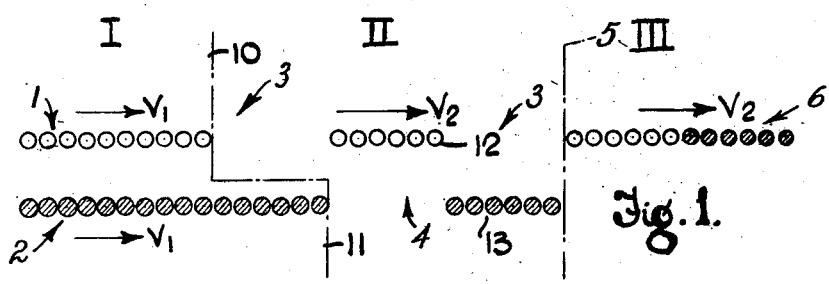
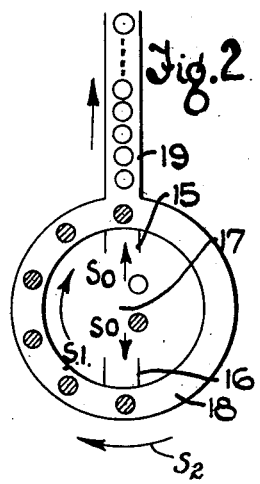
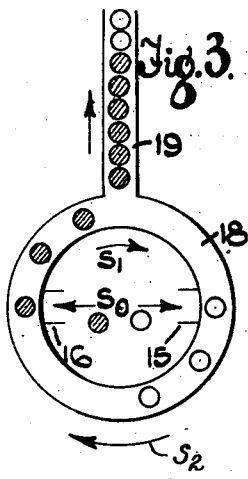
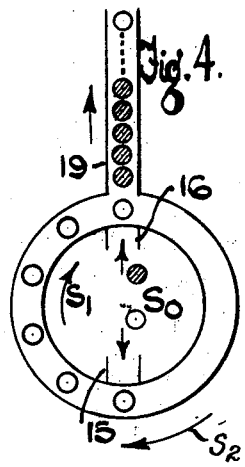
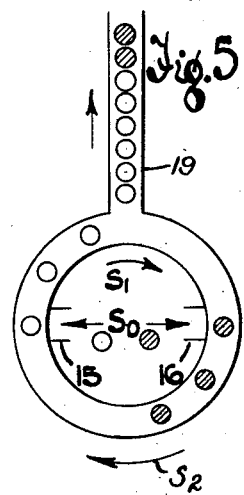
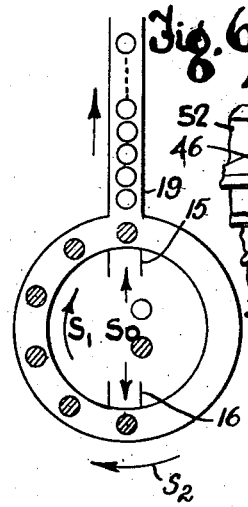
INVENTORS.
WALTER HORTON
GORDON HOWARD TOWNEND
BY
Kurt Kelman
AGENT

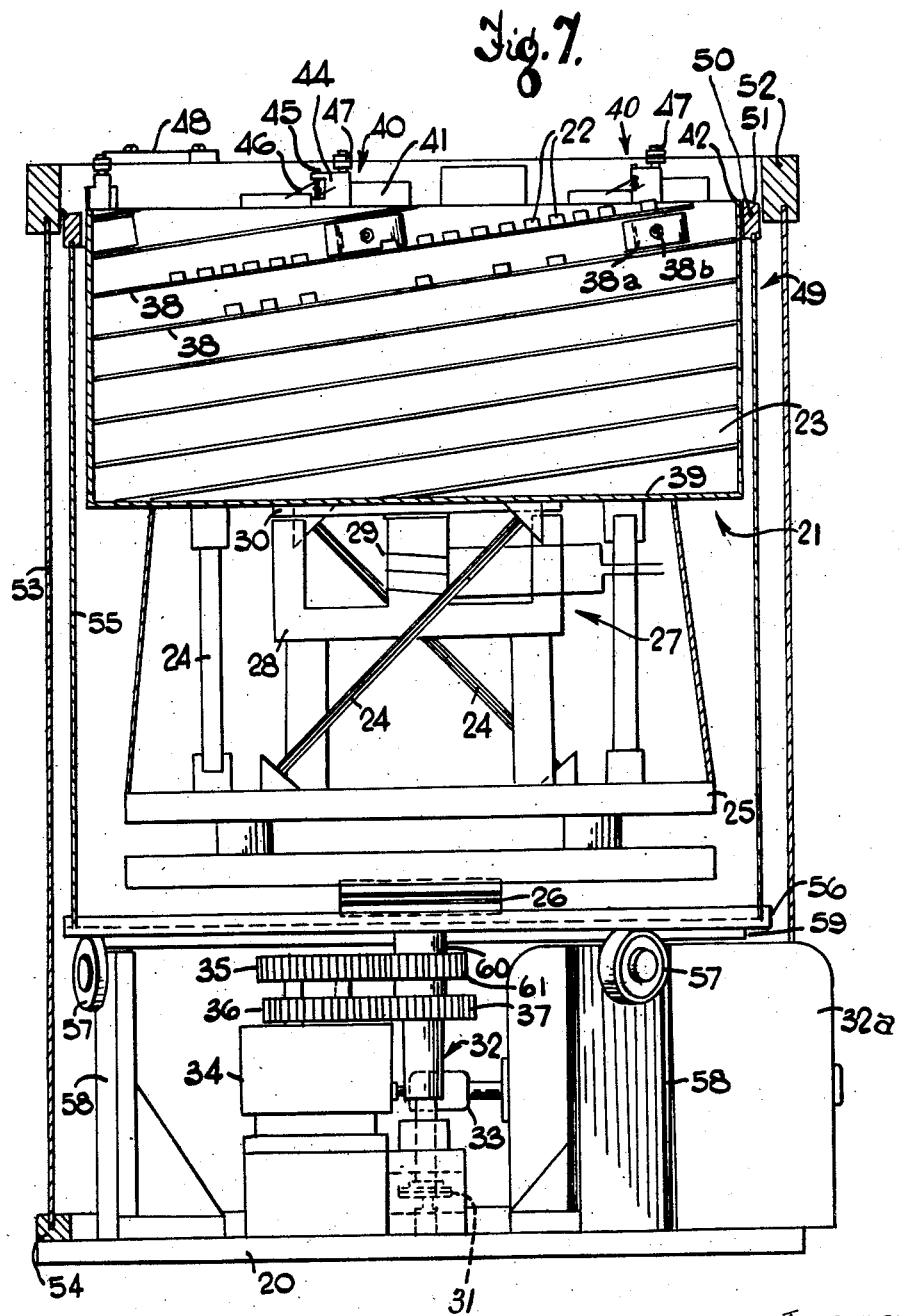

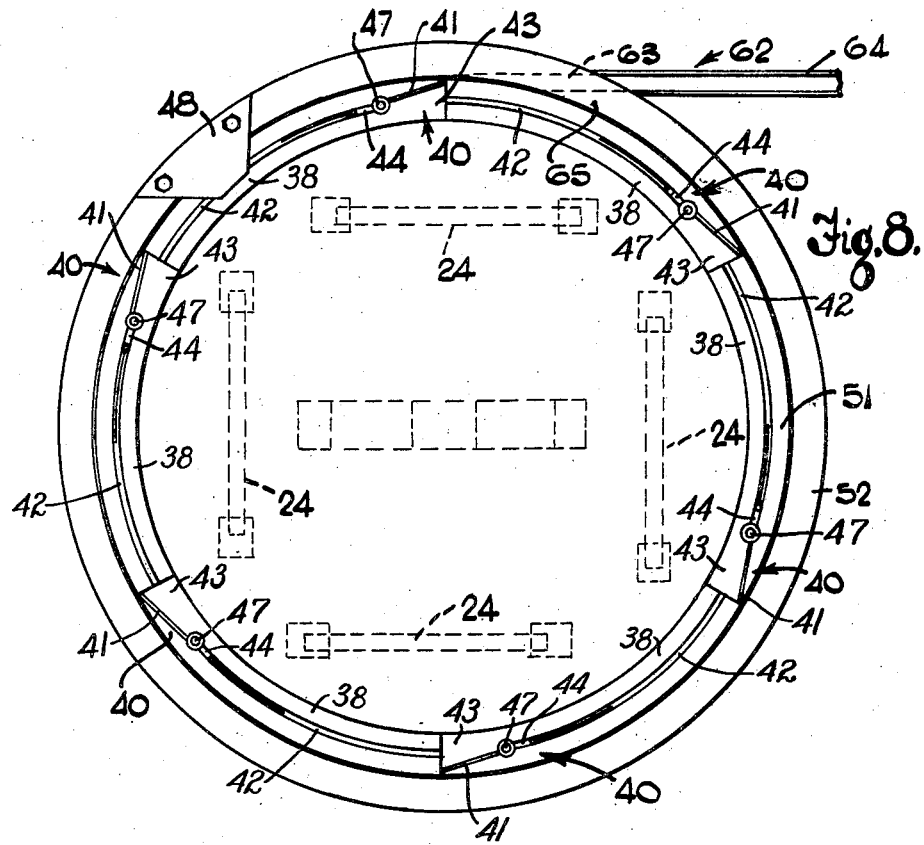

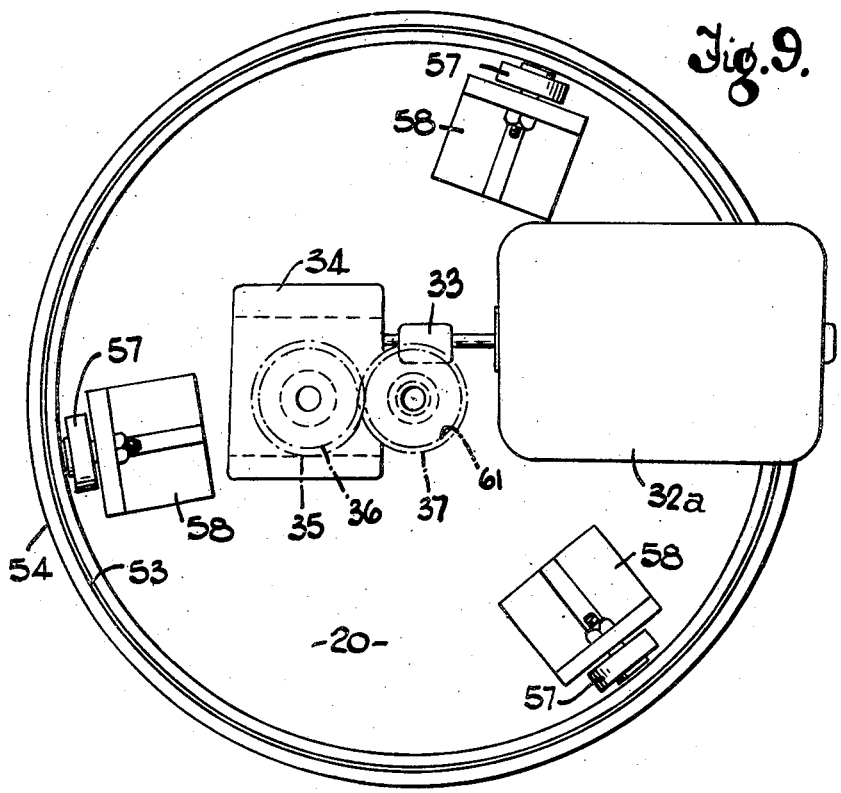

United States Patent Office 3,112,022
Patented Nov. 26, 1963

3,112,022
METHODS AND APPARATUS FOR FORMING A STREAM OF ARTICLES
Walter Horton, Codsall, and Gordon Howard Townsend, Compton, Wolverhampton, England, assignors to G.K.N. Group Services Limited, Smethwick, England, a British company
Filed Mar. 22, 1961, Ser. No. 97,504
Claims priority, application Great Britain Mar. 28, 1960
16 Claims. (Cl. 198—32)

In many processes involving the manufacture, handling, conveyance, or treatment of articles, which expression is herein intended to include discrete pieces of material as well as formed or fabricated articles, it is often required to establish a stream of such articles wherein the articles travel one behind another.

It is desired in many cases that the speed of the stream, that is to say, the number of articles passing a stationary reference point in unit time, shall have at least a minimum value in order to ensure that the operation for which the stream is required to be established shall be performed efficiently or at the desired rate.

A particular instance of this problem to which reference is made by way of example only is the batching (that is to say counting and segregation into lots each containing a predetermined number of articles) of fastening elements for example wood screws which are ordinarily sold in boxes or other packages containing a predetermined number such as one gross. In particular, the speed of a stream of wood screws is determined by the time taken to bring each such screw in a bulk supply thereof into a predetermined orientation, and to impart to it, after it has been brought into this orientation, motion in a predetermined direction. These factors result in the production of a stream of screws which has a lower speed than that which is capable of being handled by batching apparatus, and the formation of the stream thus represents a limitation upon the rate at which batching can be performed and hence upon the overall efficiency of the process of producing wood screws including the batching thereof.

It will be evident that analogous factors limit the speed of formation and hence the speed of travel of streams of other articles.

One object of the present invention is to provide an improved method of forming a stream of articles, enabling the articles to be delivered to an outlet or delivery station at a rate which is higher than that which can be achieved by direct formation of a stream from a mass or assemblage of articles or with improved reliability as to positioning or orientation of the articles in the stream.

To this end the invention involves combining a plurality of primary streams into a single main stream and a specific object of the invention is to avoid obstruction of the articles of any one of the primary streams by those of another primary stream in effecting the combination of the streams.

A further object of the invention is to enable a single main stream of articles to be formed from a plurality of primary streams in which the initial spacings of the articles from each other along each primary stream are not rigidly controlled.

A further object of the invention is to provide a new or improved apparatus for establishing a plurality of primary streams of articles and for combining them into a main stream.

The invention is illustrated in the accompanying drawings wherein:

FIGURE 1 is a diagrammatic illustration showing in a simplified form the steps involved in performance of the method of the invention.

FIGURES 2 to 6 are views similar to FIGURE 1 but elaborated to show the actual performance of the method of the invention involving the delivery of primary streams of articles on to an endless main stream-forming path from which they are removed to form the main stream.

FIGURE 7 is a view in side elevation and partly in cross section showing, by way of example, one construction of apparatus in accordance with the invention for carrying out the method illustrated in principle in FIGURE 2.

FIGURE 8 is a plan view of the apparatus shown in FIGURE 3.

FIGURE 9 is a plan view of the apparatus shown in FIGURE 3 with the bowl inlet members and intermediate conveyor member removed, and FIGURE 10 is a fragmentary view on an enlarged scale showing one of the inlet members and its associated device for preventing delivery of articles at a predetermined stage in the operation.

Referring firstly to FIGURE 1 this illustrates the formation of a main stream of articles from two primary streams.

One of the primary streams 1 consisting of a row of articles travelling in single file in the direction indicated by the arrows in section I of FIGURE 1 is represented by a series of unfilled circles and the other stream is similarly represented by a series of filled circles.

The articles contained in the streams 1, 2, respectively may travel with a speed V1. The delivery rate of each stream, that is to say the number of articles passing a stationary reference point in unit time, is dependent upon both this speed V1 and the average spacing between the individual articles contained in each stream.

It is not possible however to increase the delivery rate of either of the streams merely by accelerating individual articles to a higher speed as each passes a given point, because although the articles will then be travelling faster the spaces between them will be greater, and the number of articles passing a further point downstream of that first mentioned in a given time will remain unchanged.

The delivery rate of articles in each primary stream is dependent upon the rate at which articles can be formed up into this stream and this is limited by a number of factors dependent upon the nature of the articles and the type of apparatus suitable for forming them up into a stream. The present invention provides a method whereby a main stream is formed from two or more primary streams, the main stream providing for a rate of delivery which is greater (if desired) than that which can be achieved in any one primary stream such as those represented at 1, 2, by the filled and unfilled circles in section I of FIGURE 1.

Alternatively, in some cases it may be desired that instead of utilising the method of the invention to form a main stream which affords a delivery rate greater than that which can be attained in any given primary stream, the delivery rates afforded by the primary streams may be deliberately reduced in order to have greater reliability as to other factors such as the orientation of the articles.

In practice it will usually be advantageous to operate the primary streams 1, 2, at a delivery rate which is less than the theoretical maximum which could be attained in order to have this greater reliability or to facilitate the formation of the primary streams, and to form a main stream having a delivery rate which is somewhat less than the theoretical maximum which could be obtained.

It will further be understood that although in FIGURE 1 we have shown two primary streams 1, 2, only for the sake of simplicity, the invention may be carried out utilising a greater number of primary streams as will be evident in the following description of apparatus whereby the method may be performed.

In order to effect combination of the two primary streams 1, 2, shown in section I of FIGURE 1 without mutual interference between the articles contained in one stream with those in the other, the speed of travel of the articles in each of these streams increased. This is preferably done in such a way as to form in respective streams 1, 2, groups of articles such as 12, 13, each in the form of a row, with spaces 3, 4, intervening between the groups. The spacings between articles contained in a group may be substantially unchanged.

The positions occupied by the spaces 3, 4, formed in this way in the streams respectively are co-ordinated to coincide respectively with groups 13, 12 of articles so that the streams can be merged or combined to form a single main stream 6 without the articles of one primary stream being obstructed by those of the other. This is achieved by spacing apart, in the direction of travel, the delivery point or station at which speed increase takes place in one stream relatively to that at which the speed increase takes place in another stream. As seen diagrammatically in section II of FIGURE 1, the boundary line between sections I and II has a part 10 which indicates the delivery point or station of speed increase for primary stream 1 and a part 11 which similarly represents the delivery point or station of speed increase for primary stream 2.

In section III of FIGURE 1 the spaced groups 12, 13 of the two primary streams respectively are combined at the point or station represented by the line 5 to form a single main stream 6 by occupation of the spaces afforded between the article groups of one primary stream by the article groups of the other primary stream. In practice sections II and III may be combined with each other rather than performed separately by causing both primary streams to occupy respective sections of an endless path of travel for a period after passing delivery points 10 and 11.

FIGURES 2 to 6 illustrate diagrammatically a particular mode of carrying into effect the method illustrated in principle in FIGURE 1 and in which delivery of primary streams takes place into an endless path.

In each of FIGURES 2 to 6 the primary streams are delivered from inlet members 15 and 16 which rotate about an axis 17, which conveniently is vertical. Surrounding the inlet members 15 and 16 is an endless main stream-forming path which is occupied by an annular conveyor means 18 rotating in the same direction as the delivery stations. At a position along the circumference of the conveyor means 18 is an outlet member 19 into which the articles are received or removed collected from the conveyor means 18.

With the inlet members 15 and 16 in the positions shown in FIGURE 2, and fed respectively with primary streams of articles represented by unfilled and filled circles, the part of the outlet member 19 immediately adjacent to the conveyor means 18 will be occupied by a row of articles originally delivered by the inlet member 15 (unfilled circles) and the whole of the segmental half of the conveyor means 18 which is about to travel past the outlet member 19 will be occupied by a row of articles (filled circles) delivered from the inlet member 16.

The peripheral speed $S_2$ of the conveyor means is greater than the peripheral speed $S_1$ of the inlet members by an amount which is equal to or greater than the speed of travel $S_0$ of the articles relatively to the inlet members 15 and 16 themselves, so that upon delivery of the articles onto the conveyor means 18 the original spacing, if any, between successive articles in each row is maintained, and there is at least no tendency for articles from a given inlet member to be crowded together.

The speed $S_2$ must however not be so much greater than the speed $S_1$ that an article delivered from the inlet member 15, when occupying the position shown in FIGURE 2, will overtake the inlet member 16 before the latter has reached or strictly, just passed, the outlet member 19 as seen in FIGURE 4. In other words, the row of articles delivered from the inlet member must not lengthen to the extent that it overtakes the inlet member 16. The same condition is true for the row of articles delivered from the inlet member 16 with respect to overtaking the inlet member 15.

The desirable conditions of operation which produce some degree of spacing between individual articles at the outlet member, and some spacing between successive groups of articles delivered from the individual primary streams, are represented by the equations:

$$S_2 \geq S_0 + S_1 \qquad (1)$$

$$S_2 \leq \frac{S_1 n}{n-1} \qquad (2)$$

where $S_0$ is the speed of articles in each primary stream relative to the inlet member $S_1$ is the speed of movement of the inlet members along said endless path $S_2$ is the speed of the articles along the main stream-forming path, e.g. conveyor means 18

$n$ is the number of inlet members

It will be seen that in FIGURE 3 when the inlet members collectively have rotated through 90° the inlet member 15 has delivered three articles onto the conveyor means 18, the inlet member 16 has delivered three additional articles, and the six articles previously delivered by the inlet member 16 have moved into the outlet member 19.

FIGURE 4 shows the conditions after a further 90° rotation. Three further articles delivered from the inlet member 16 together with the nine already delivered in FIGURE 3 will then have moved into the outlet member 19, and at this time the first of the articles delivered from the conveyor member 15 will just have arrived at the outlet member 19.

The conditions represented by FIGURE 5 are similar to those represented by FIGURE 3 except that the positions of the inlet members are reversed.

FIGURE 6 illustrates the completion of the cycle of operations and is equivalent to FIGURE 2.

It will be evident that the annular conveyor means serves to collect in a single annular row all the articles delivered to it from primary streams by the inlet members 15 and 16. There is never any obstruction to such delivery by the articles already on the conveyor means 18 because the articles are collected or removed therefrom into the outlet member 19 before such obstruction can occur, provided that the conditions of Equation No. 2 hereinbefore set forth are observed.

A specific form of apparatus for carrying out the method illustrated in principle in FIGURE 2 and in which six primary streams are formed is shown in FIGURES 7 to 9.

This apparatus comprises a base structure 20 of any suitable form on which is mounted for rotation about a vertical axis a hopper assembly 21 for containing a bulk supply of articles to be formed into a stream. For the sake of clarity these articles are not shown in loose mass or assemblage in the base of the hopper, but certain of them are indicated at 22 on one of the trackways feeding an inlet member as hereinafter described.

The hopper assembly comprises a hopper bowl or body 23 of generally cylindrical open-topped form beneath which is disposed a mounting structure which may comprise a plurality of circumferentially spaced inclined spring rods 24, connected at their upper ends to the underside of the hopper body 23 and all arranged to incline in the same "hand." The rods 24 are fixedly connected to a mounting member 25 at their lower ends.

The mounting member is journalled for rotation about a vertical axis by means of a bearing 26.

Between the mounting member 25 and the hopper body 23 is mounted a vibratory motor 27 of any suitable form, comprising, for example, a core structure 28 upon which is carried a winding 29 and which is supported from the mounting member 25. Co-operative with the core structure is an armature 30 secured to the underside of the hopper body 23.

It will be evident that the application of pulsating or alternating current to the winding 29 will produce movement of the armature 30 towards and away from the core structure, and the inclination of the rods 24 will result in an oscillatory vibration of the hopper body with a component of rising and falling movement. Current supply for the winding 29 may be obtained from any suitable external source and conveyed to the winding through the intermediary of slip rings 31 and conductors extending axially therefrom through the shaft assembly 32 which transmits drive to the mounting member 25 as hereinafter described.

Bodily rotation of the hopper body is effected from a drive motor 32a mounted on the base 20 and coupled through a shaft and coupling 33 to a reduction gear box 34 which may be of the worm and worm wheel type and which has keyed or otherwise fixed to its output shaft two gears 35 and 36.

The lower of these gears 36 meshes with a gear 37 fast on the inner shaft of the concentric shaft assembly 32, this inner shaft driving the mounting member 25.

Internally of the hopper body there is provided on the inner face of its side wall a plurality of trackway structures forming a primary conveyor means for setting up the primary streams of articles.

Such trackway structures may comprise metal strips 38 attached to the side wall of the hopper, these strips inclining upwardly in a helical manner from the bottom wall 39 of the body. As illustrated, the strips may be of plane flat form, or each may be provided with only a low upstanding flange or fence at its inner boundary, so that articles such as 22 placed in a loose mass or assemblage in the hopper body can be received on the upwardly presented faces of the strips 38. In the arrangement illustrated there are six such strips 38 forming six trackway structures.

Associated with the strips are members 38a which project inwardly from the side wall of the hopper body above each strip and occupy a proportion of the width thereof.

This ensures that articles such as 22 can by-pass the projections 38a only in single file. Should any articles 22 tend to form into two files arranged side-by-side the inner file would be displaced inwardly and articles contained in this inner file would fall back into the bottom of the hopper body in consequence of inward displacement of both files by the projections 38a. The projections 38a may be formed of pieces of bowed resilient strip metal and provided with tightening means such as nuts 38b for enabling the extent of overlap with the strips 38 to be adjusted in accordance with the width of the articles to be formed into streams.

At the upper end of each strip 38 is provided an inlet member, these being indicated at 40 (FIGURES 7 and 8).

The inlet members as seen in FIGURES 8 and 10 each comprise an outer lateral boundary wall 41 which lies in a vertical or approximately vertical plane and projects outwardly and above the upper edge 42 of the side wall of the hopper body so as to overlap radially with an intermediate member in the form of an annular conveyor member 50 hereinafter referred to. The inlet members have bottom walls formed by widened end portions 43 of the strips 38 so as also to overlap radially with said annular conveyor. These portions 43 are connected to the lower edges of the boundary walls 41 and form supports for the articles undergoing delivery from each of the inlet members onto the upwardly presented face 51 of the annular conveyor 50.

Incorporated in or associated with each inlet member 40 is a means for preventing delivery of articles therefrom at certain times. Such means comprises a flap member 44 pivoted about an upstanding pin 45 and normally urged, by means of a torsion spring 46, to an inoperative position in which it is co-planar or approximately so with the boundary wall 41 and the adjacent part of the side wall of the hopper body.

Mounted on each flap member 44 is a cam follower 47 in the form of a roller which cams into contact, during rotation of the hopper body, with a cam 48 projecting into the paths of movement of the cam followers 47 to deflect the flap members inwardly across then associated strips 38 and remove any article resting at that particular position thereon.

Vibration of the hopper body produced by the vibrator motor, already described, causes articles, such as those indicated at 22, to travel upwardly along the strips 38 and to be delivered from the inlet members 40.

Extending about the hopper body at its upper end is an intermediate annular conveyor indicated generally at 49. This intermediate conveyor comprises an annular conveyor member 50, the upwardly presented face 51 of which slopes somewhat downwardly in an outward radial direction. The conveyor member 50 is bounded at its outer side by an upstanding wall 52 which is stationarily supported by means of a sheet metal casing 53 secured in a slot in an upwardly projecting ring 54 on the base 20.

The conveyor member 50 is also supported by a cylindrical member 55 of sheet metal, the lower end of which is secured to a rotating disc 56 supported for rotation about an axis concentric with the shaft assembly 32 on rollers 57, conveniently three in number, carried by pillars 58 extending upwardly from and secured to the base 20.

The disc 56 has at its underside a ring or plate 59 affording a radially presented shoulder engaging with the inner faces of the rollers 57 to provide for radial location of the disc and hence the annular conveyor member 50.

The disc 56 is fixed to an outer tubular or sleeve-like shaft 60 of the concentric shaft assembly 32. The shaft 60 is fast with a gear 61 which meshes with the gear 35 and provides for rotation of the annular conveyor member 51 in the same direction as that in which the hopper body 23 rotates but at a speed somewhat greater than this, as determined by the equations previously referred to. Thus the speed of the annular conveyor member 51 may typically be equal to or slightly less than 1⅓ times the speed of the hopper body 23. The actual speed of rotation of the hopper body may typically be 17 r.p.m.

The apparatus further comprises an outlet member 62 formed partly as a slot 63 through the outer boundary wall 52 and partly as a channel or duct 64 which is a continuation of the slot 63. Travel of the articles along the outlet member may be promoted by means of a belt or slat conveyor which forms the bottom wall of the channel or duct, or alternatively this may be inclined downwardly to provide for gravitational delivery of the articles if desired, and if these are not required to travel at a speed greater than that which can be achieved in this way.

The cam 48 is so positioned relatively to the outlet member 62 that the flap members 44 are operated to displace any article back into the bottom of the hopper body which if delivered from the inlet member 40 concerned onto the intermediate conveyor member 50 would impinge or be likely to impinge on the corner 65 bordering on the slot 63. If this occurred there would be a risk of the article concerned remaining on the conveyor member 50 instead of passing into the outlet member 62, and such article would then obstruct delivery of further articles onto the conveyor member 50 in the next succeeding cycle of operation.

As a possible alternative, shield plates may be fixed to the member 52 to act as closures for the delivery ends of the inlet members. The shield plates would occupy such positions as would be appropriate to prevent articles being delivered from the inlet members onto the conveyor member 50 at positions from which they would, or would be likely to, impinge on the corner 65.

It will be understood that after delivery onto the conveyor member 50 the articles tend to move radially outwardly under the influence of centrifugal force and to some extent because of the outward slope of the face 51, but a certain finite time is required for the articles to take up this position and there would, in the absence of some device to prevent delivery be a risk that newly delivered articles would not take up this position ready for feeding into the slot 63 before the conveyor member 50 had reached the slot 63.

The general manner of operation of the apparatus shown in FIGURES 8 to 10 will be apparent from the foregoing description taken in conjunction with the description of the method illustrated in FIGURES 2 to 6.

It will be understood that although in the illustrated embodiment of the apparatus the hopper body and the intermediate annular conveyor member 51 are both rotated in the same direction and at different speeds whilst the outlet member 62 is stationary, it would be possible to adopt an arrangement in which any one of these three members is stationary and the other two move at the appropriate relative speeds in the appropriate direction.

It is preferred, however, that the outlet member shall be stationary because of the greater convenience in thereafter conveying away or handling the articles.

What we claim then is:

1. A method of forming a main stream of articles comprising,
   forming a plurality of primary streams of the articles,
   feeding said primary streams of articles to respective delivery stations spaced apart along a main stream forming path,
   effecting relative movement while delivering said articles from said delivery stations between the latter collectively and those of the articles already delivered to said path in a direction therealong to form lengthening rows of articles on said path from each of said delivery stations towards the next succeeding one of said delivery stations,
   and collecting the articles sequentially from said path to form said main stream before any of the rows lengthens sufficiently to pass said next succeeding one of said delivery stations.

2. A method of forming a main stream of articles comprising,
   forming a plurality of primary streams of the articles,
   feeding said primary streams of articles to respective delivery stations spaced apart in a circuit along an endless main stream forming path,
   effecting relative movement while delivering said articles from said delivery stations between the latter collectively and those of the articles already delivered to said path in a direction therealong to form lengthening rows of articles on said path from each of said delivery stations towards the next succeeding one of said delivery stations,
   and sequentially diverting the articles from said path to form said main stream before any of the rows lengthens sufficiently to pass said next succeeding one of said delivery stations.

3. A method of forming a main stream of articles comprising,
   forming a plurality of primary streams of the articles,
   feeding said primary streams of articles to respective delivery stations spaced apart in a circuit along an endless main stream forming path,
   effecting relative movement while delivering said articles from said delivery stations between the latter collectively and those of the articles already delivered to said path in a direction therealong to form lengthening rows of articles on said path from each of said delivery stations towards the next succeeding one of said delivery stations,
   and effecting relative movement between a receiving station and said path lengthwise thereof, while diverting said articles sequentially from said path to form said main stream before any of said rows has lengthened sufficiently to pass said next succeeding one of said delivery stations.

4. A method of forming a main stream of articles comprising,
   forming a plurality of primary streams of the articles,
   feeding said primary streams of articles to respective delivery stations spaced apart in a circuit along an endless main stream forming path,
   moving said delivery stations lengthwise of said path while maintaining their relative spacings from each other to deliver articles onto said path,
   moving the delivered articles along said path in the same direction as that in which said delivery stations are moved but at a higher speed to form, along said path, lengthening rows of articles extending from each of said delivery stations towards the next succeeding one thereof in the direction of movement,
   and diverting articles sequentially from said path at a stationary receiving station to form said main stream,
   the speed of movement of said delivered articles being sufficient to carry said articles away from their respective delivery stations and at a rate affording unobstructed delivery
   but less than that which would lengthen said rows beyond said next succeeding ones of said delivery stations before said diverting of said articles.

5. A method of forming a main stream of articles comprising,
   forming a plurality of primary streams of the articles,
   feeding said primary streams of articles to respective delivery stations spaced apart in a circuit along an endless main stream-forming path,
   moving said delivery stations lengthwise of said path while maintaining their relative spacings from each other to deliver articles onto said path,
   moving the delivered articles along said path in the same direction as that in which said delivery stations are moved but at a higher speed to form, along said path, lengthening rows of articles extending from each of said delivery stations towards the next succeeding one thereof in the direction of movement,
   and diverting articles sequentially from said path at a stationary receiving station to form said main stream,
   the speed movement of said delivered articles being greater than the speed of delivery from said delivery stations
   but less than the product of the speed of movement of said delivery stations collectively and the ratio of the number of delivery stations to this number minus one.

6. A method of forming a main stream of articles comprising,
   forming a plurality of primary streams of the articles,
   feeding said primary streams to respective delivery stations, circumferentially spaced apart at one radial boundary of an annular main stream forming path,
   effecting relative movement while delivering said articles from said delivery stations between the latter collectively and those of the articles already delivered to said path in a direction therealong to form lengthening rows of articles on said path from each of said delivery stations towards the next succeeding one of said delivery stations, and collecting the articles sequentially from said path at the other radial boundary thereof to form said main stream before any of the rows lengthens sufficiently to pass said next succeeding one of said delivery stations.

7. A method of forming a main stream of articles comprising, forming a plurality of single file primary streams of articles unconstrained positively as to relative longitudinal spacing between the articles in each of said streams, feeding said primary streams of articles to respective delivery stations spaced apart along a main stream forming path, effecting relative movement while delivering said articles from said delivery stations between the latter collectively and those of said articles already delivered to said path, guiding said delivered articles without positive constraint as to their relative longitudinal spacings to form single file lengthening rows on said path from each of said delivery stations towards the next succeeding one of said delivery stations, and sequentially diverting said articles from said path without positive constraint as to their relative longitudinal spacings to form them in single file into said main stream before any of said rows lengthens sufficiently to pass said next succeeding one of said delivery stations.

8. Apparatus for forming a main stream of articles comprising, a plurality of stream forming means for forming respective primary streams of articles, a plurality of inlet members operatively connected with respective ones of said stream-forming means to receive said articles therefrom, said inlet members being spaced apart along a main stream-forming path to deliver said articles thereto, supporting means for supporting said delivered articles on said path, collecting means disposed in operative relation to said supporting means to receive articles in sequence from said path, and drive means for effecting relative movement along said path between said inlet members collectively and said supporting means and for forming lengthening rows of articles on said supporting means from each inlet member towards the next succeeding one thereof, and for effecting relative movement between said supporting means and collecting means, in a direction, and at a speed, such that the rows of articles are received by said collecting means before lengthening sufficiently to pass said next succeeding one of said inlet members.

9. Apparatus for forming a main stream of articles comprising, a plurality of stream-forming means for forming respective primary streams of articles, a plurality of inlet members operatively connected with respective ones of said stream-forming means to receive said articles therefrom, said inlet members being disposed at spaced apart positions in a circuit along an endless main stream forming path, supporting means for supporting said delivered articles on said path, collecting means disposed in operative relation to said supporting means to receive articles in sequence from said path, and drive means for effecting relative movement along said path between said inlet members collectively and said supporting means and for forming lengthening rows of articles on said supporting means from each inlet member towards the next succeeding one thereof, and for effecting relative movement between said supporting means and collecting means, in a direction, and at a speed, such that the rows of articles are received by said collecting means before lengthening sufficiently to pass said next succeeding one of said inlet members.

10. Apparatus for forming a main stream of articles comprising, an annular conveyor member having an article supporting face, a plurality of stream-forming means for forming respective primary streams of articles, a plurality of inlet members operatively connected with respective ones of said stream-forming means to receive said articles therefrom, said inlet members being circumferentially spaced apart along one radial boundary of said face to deliver said articles thereto, a collecting means disposed at the other boundary of said face to receive said articles therefrom, and drive means for effecting relative rotation concentrically with said annular conveyor member between the latter and said inlet members collectively for forming lengthening rows of said delivered articles on said face, and for effecting relative movement between said annular conveyor member and said collecting means, in a direction, and at a speed, such that the rows of articles undergo removal from said face to said collecting means before any of them lengthens sufficiently to extend from that one of said inlet members from which it was delivered past the next succeeding one of said inlet members.

11. Apparatus for forming a main stream of articles comprising, an annular conveyor member having an article supporting face, a plurality of stream-forming means for forming respective primary streams of articles, a plurality of inlet members operatively connected with respective ones of said stream-forming means to receive said articles therefrom, said inlet members being circumferentially spaced apart along, and disposed adjacent to, said face to deliver articles thereto, a collecting means stationarily disposed adjacent to said face to receive articles therefrom, drive means for moving said inlet members collectively circumferentially of said face and for moving said face in the same direction at a speed sufficiently higher than that of said inlet members to prevent already delivered articles obstructing delivery of further articles from the inlet members, but less than that which would advance said delivered articles circumferentially beyond that one of said inlet members next succeeding that from which the articles concerned were delivered before removal of the foremost of said delivered articles to said collecting means.

12. Apparatus for forming a main stream of articles comprising, a plurality of stream-forming means for forming respective primary streams of articles, a plurality of inlet members operatively connected with respective ones of said stream-forming means to receive said articles therefrom, said inlet members being disposed at spaced apart positions in a circuit along an endless main stream-forming path, supporting means for supporting said delivered articles on said path, collecting means disposed in operative relation to said supporting means to receive articles in sequence from said path, and drive means for moving said supporting means and said inlet members collectively in the same direction, the speed of the former being greater than the sum of that of the latter and the speed of the articles in the primary streams, but less than the product of the speed of the inlet members times the ratio of the number of inlet members to this number minus one.

13. Apparatus for forming a main stream of articles comprising,
supporting structure,
a container for a bulk supply of the articles mounted on said structure for rotation about a vertical axis,
a plurality of circularly spaced inlet members carried by said container,
primary stream-forming trackways on said container extending internally thereof to respective inlet members,
an annular conveyor member having an article supporting face
mounted on said supporting structure concentrically with said container
to receive articles delivered from said inlet members,
an outlet member stationarily mounted on said supporting structure adjacent to said face to receive articles therefrom,
and drive means for rotating said container and for rotating said annular conveyor member at a higher speed in the same direction,
such that rows of articles delivered onto said face pass into said outlet member in succession without longitudinal overlap.

14. Apparatus for forming a main stream of articles comprising,
supporting structure,
a container for a bulk supply of the articles mounted on said structure for rotation about a vertical axis,
a plurality of circularly spaced inlet members carried by said container,
primary stream-forming helical trackways disposed internally of the container to receive the articles placed therein and extending to respective inlet members,
means for vibrating said container in a mode to produce upward feed of articles on said trackways to said inlet members,
an annular conveyor member having an article supporting face
mounted on said supporting structure concentrically with said container
to receive articles delivered from said inlet members,
an outlet member stationarily mounted on said supporting structure adjacent to said face to receive articles therefrom,
and drive means for rotating said container and for rotating said annular conveyor member at a higher speed in the same direction.

15. Apparatus for forming a main stream of articles comprising,
supporting structure,
a container for a bulk supply of the articles mounted on said structure for rotation about a vertical axis,
a plurality of circularly spaced inlet members carried by said container,
primary stream-forming trackways on said container extending internally thereof to respective inlet members,
an annular conveyor member having an article supporting face
mounted on said supporting structure concentrically with said container
to receive articles delivered from said inlet members,
an outlet member stationarily mounted on said supporting structure adjacent to said face to receive articles therefrom,
and drive means for rotating said container and for rotating said annular conveyor member at a higher speed in the same direction,
such that rows of articles delivered onto said face pass into said outlet member in succession without longitudinal overlap
and
means operatively associated with said inlet members for preventing delivery of articles therefrom when the inlet member concerned is so close to the outlet member that improper reception or non-reception of delivered articles would occur.

16. Apparatus for forming a main stream of articles comprising,
supporting structure,
a container for a bulk supply of the articles mounted on said structure for rotation about a vertical axis.
a plurality of circularly spaced inlet members carried by said container,
primary stream-forming trackways on said container extending internally thereof to respective inlet members,
an annular conveyor member having an article supporting face
mounted on said supporting structure concentrically with said container
to receive articles delivered from said inlet members,
an outlet member stationarily mounted on said supporting structure adjacent to said face to receive articles therefrom,
and drive means for rotating said container and for rotating said annular conveyor member at a higher speed in the same direction,
such that rows of articles delivered onto said face pass into said outlet member in succession without longitudinal overlap
and
a plurality of deflector means operatively associated with respective trackways for displacing articles therefrom back to said container
and actuating means for said deflector means for operating same in timed relation to approach of the inlet member concerned to said outlet
to prevent delivery of an article from said inlet member in a predetermined arc of travel of said inlet member immediately preceding said outlet member.

References Cited in the file of this patent
UNITED STATES PATENTS
2,897,947    Krupp _____ Aug. 4, 1959